Patented July 4, 1933

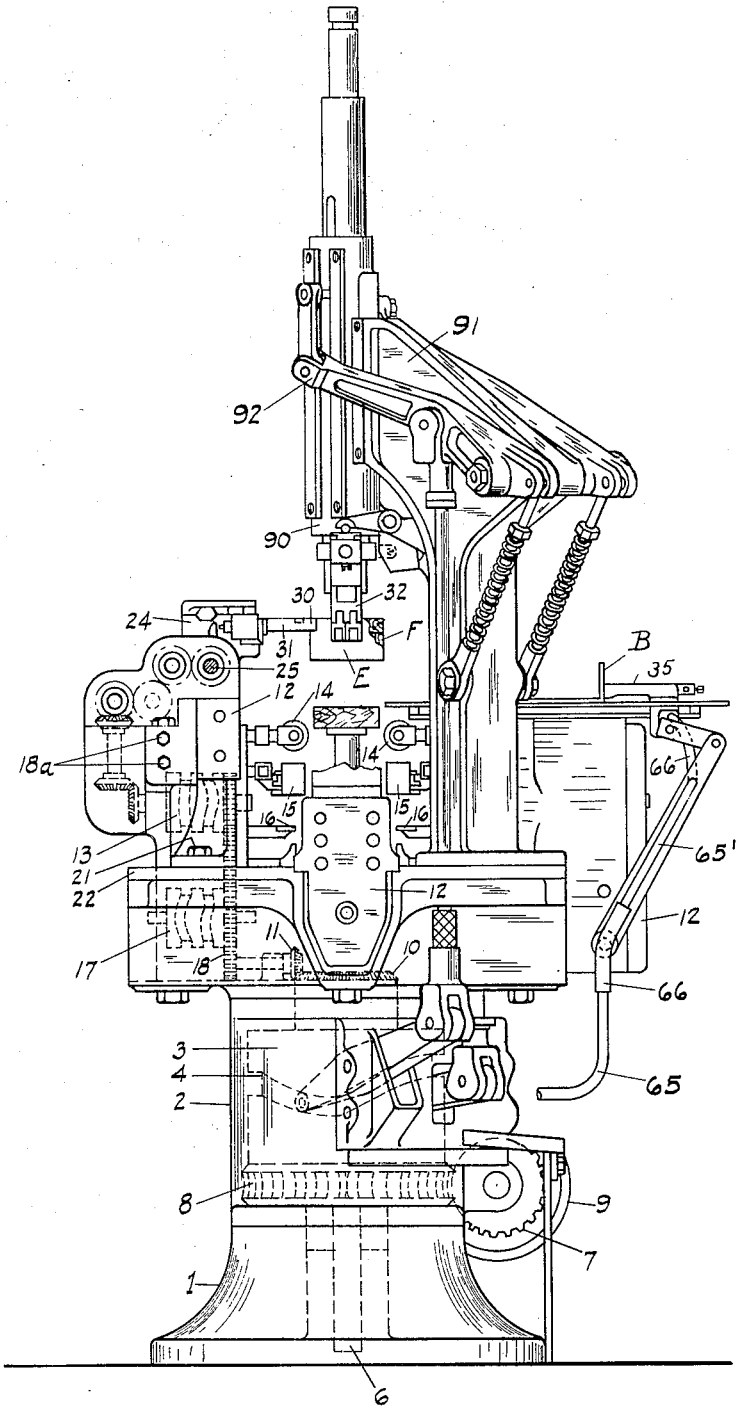

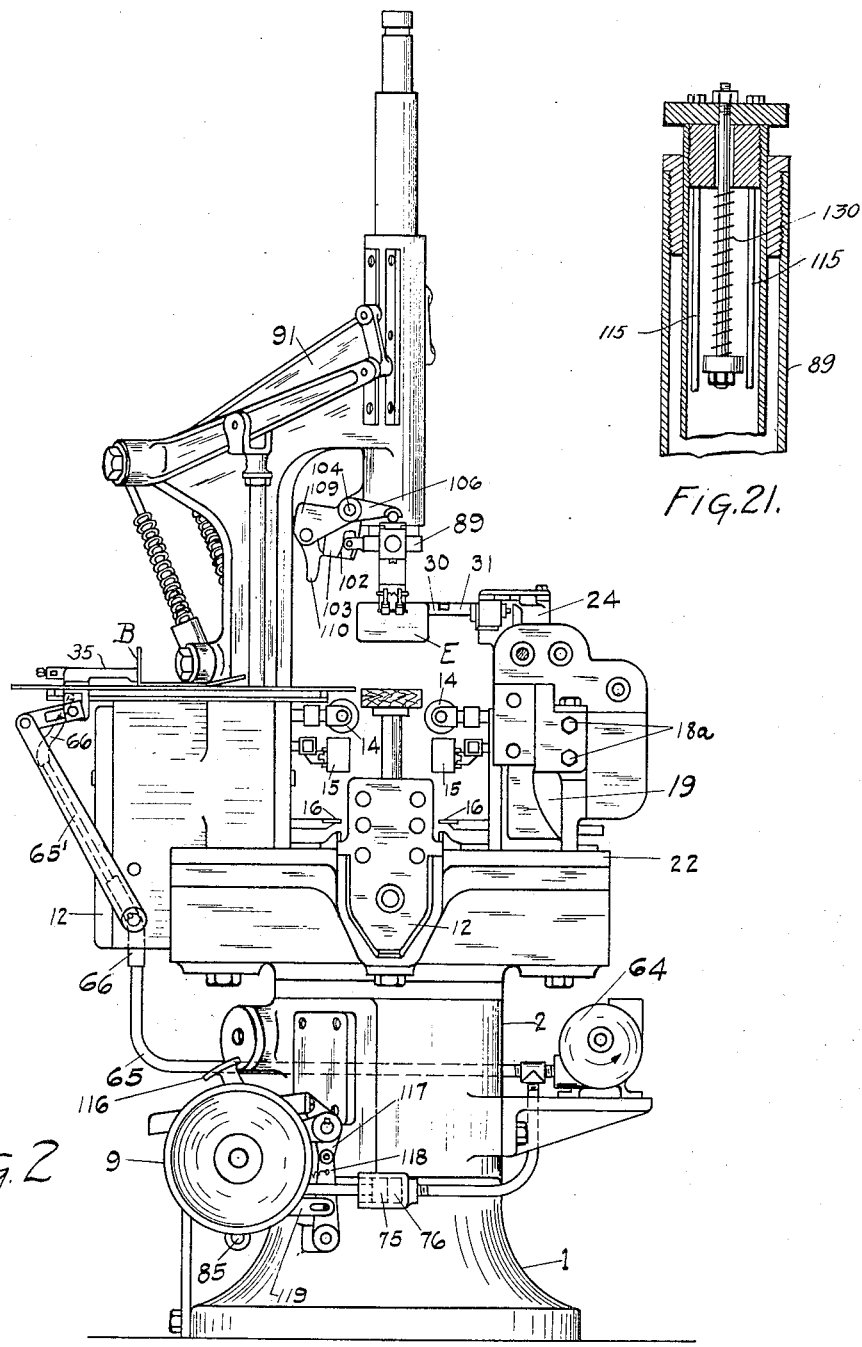

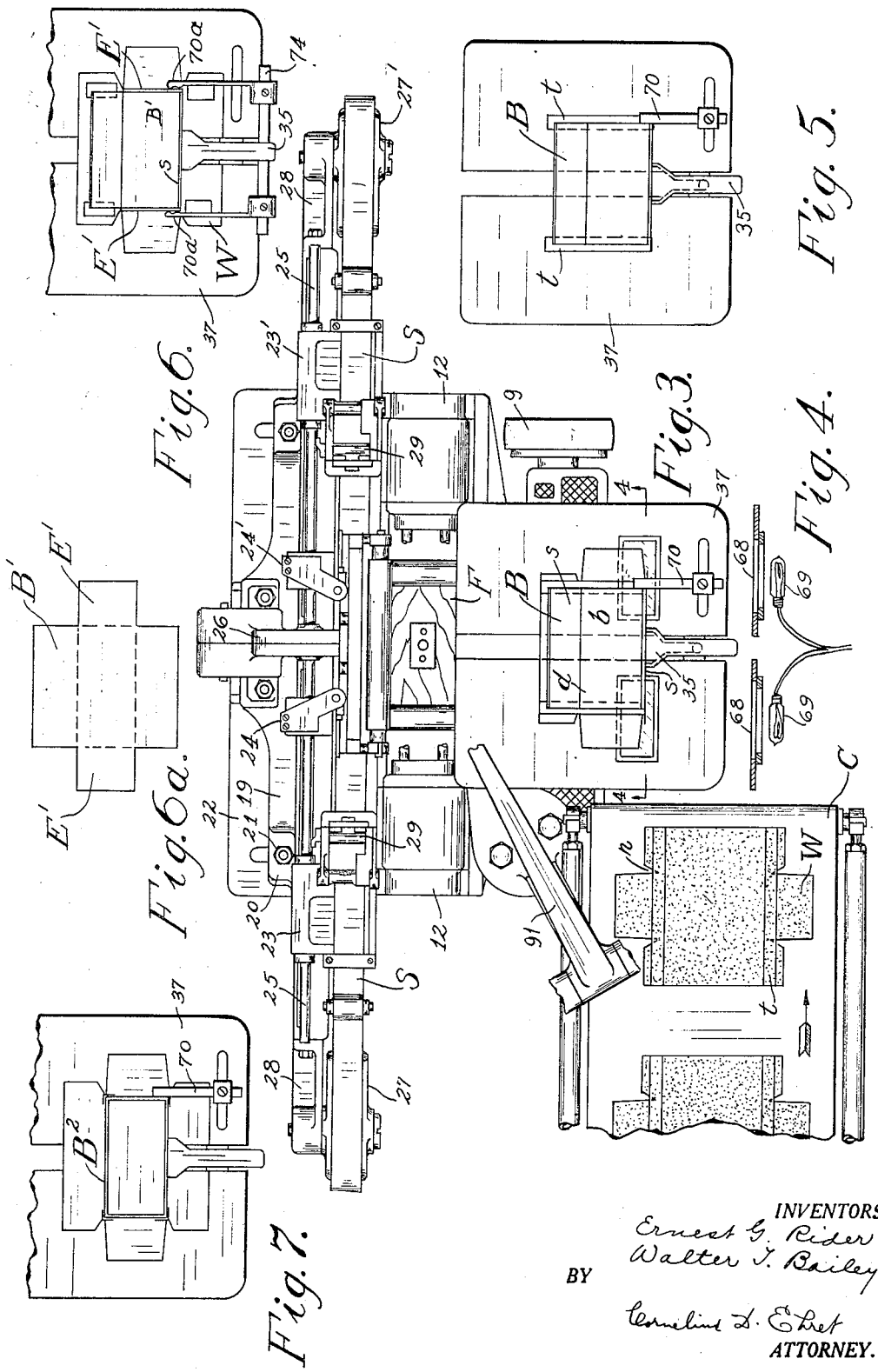

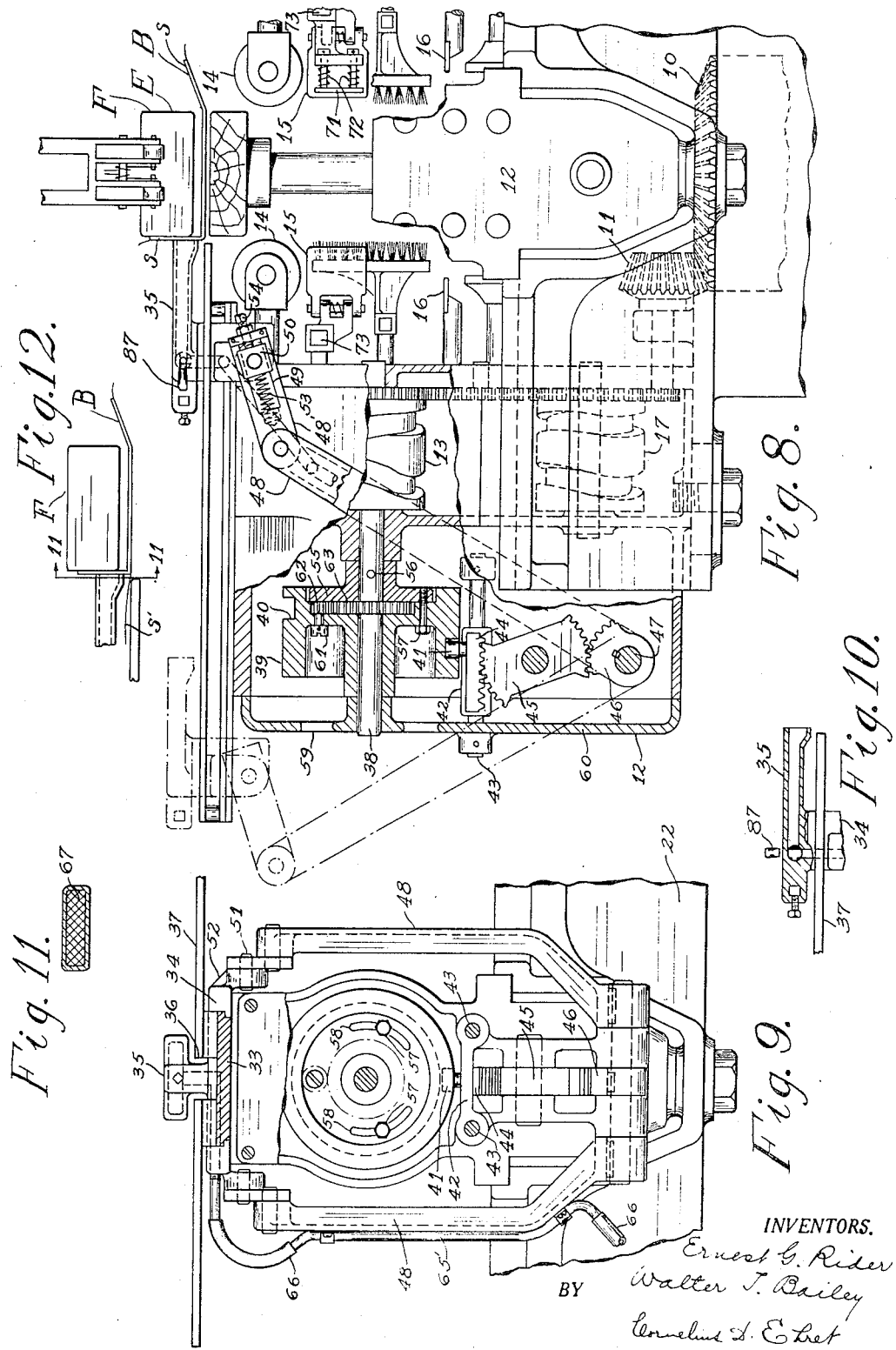

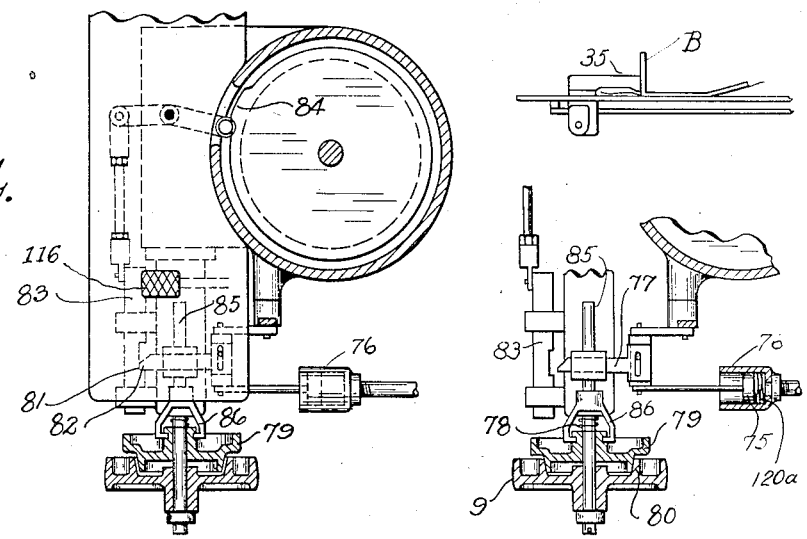
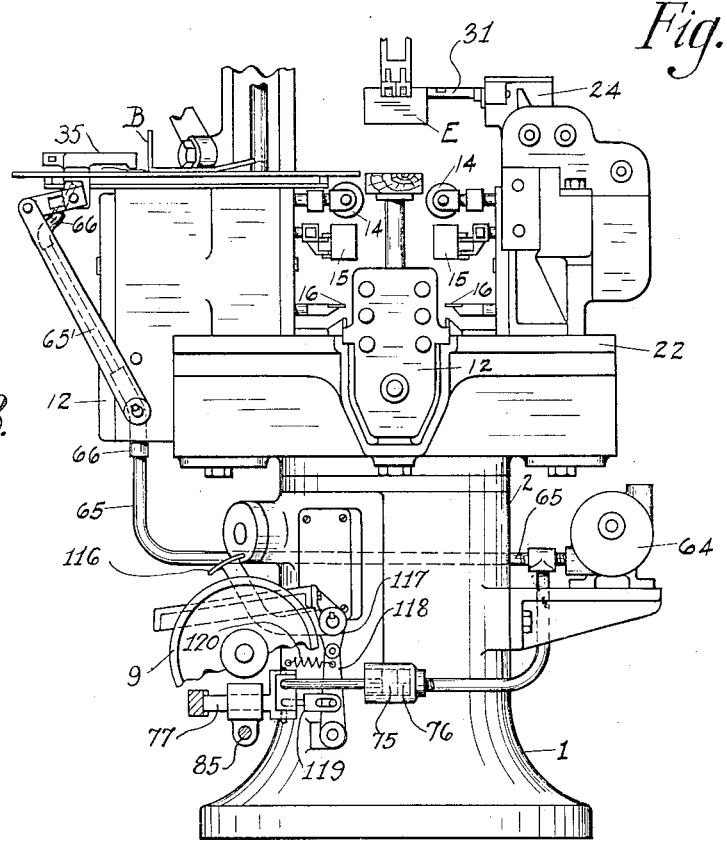

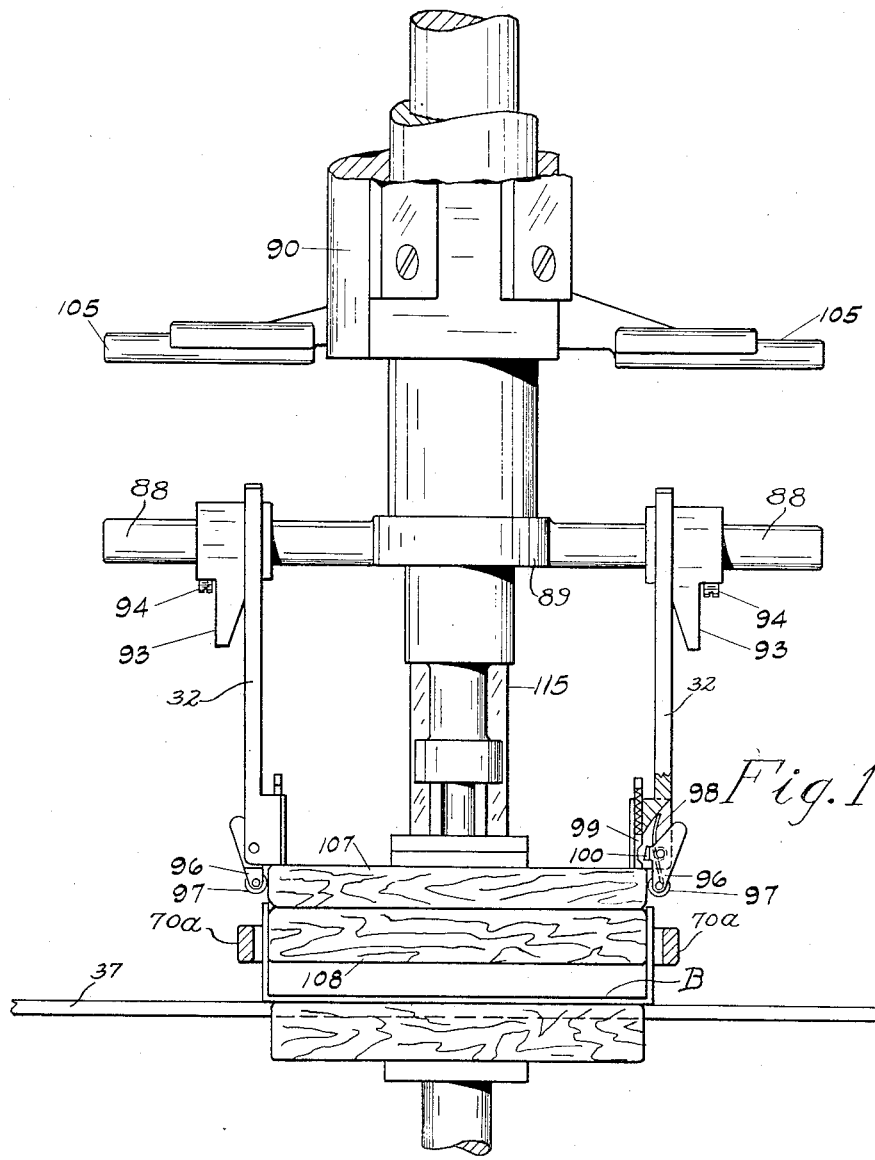
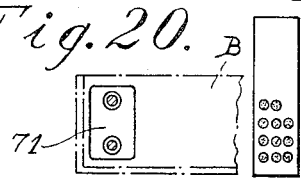

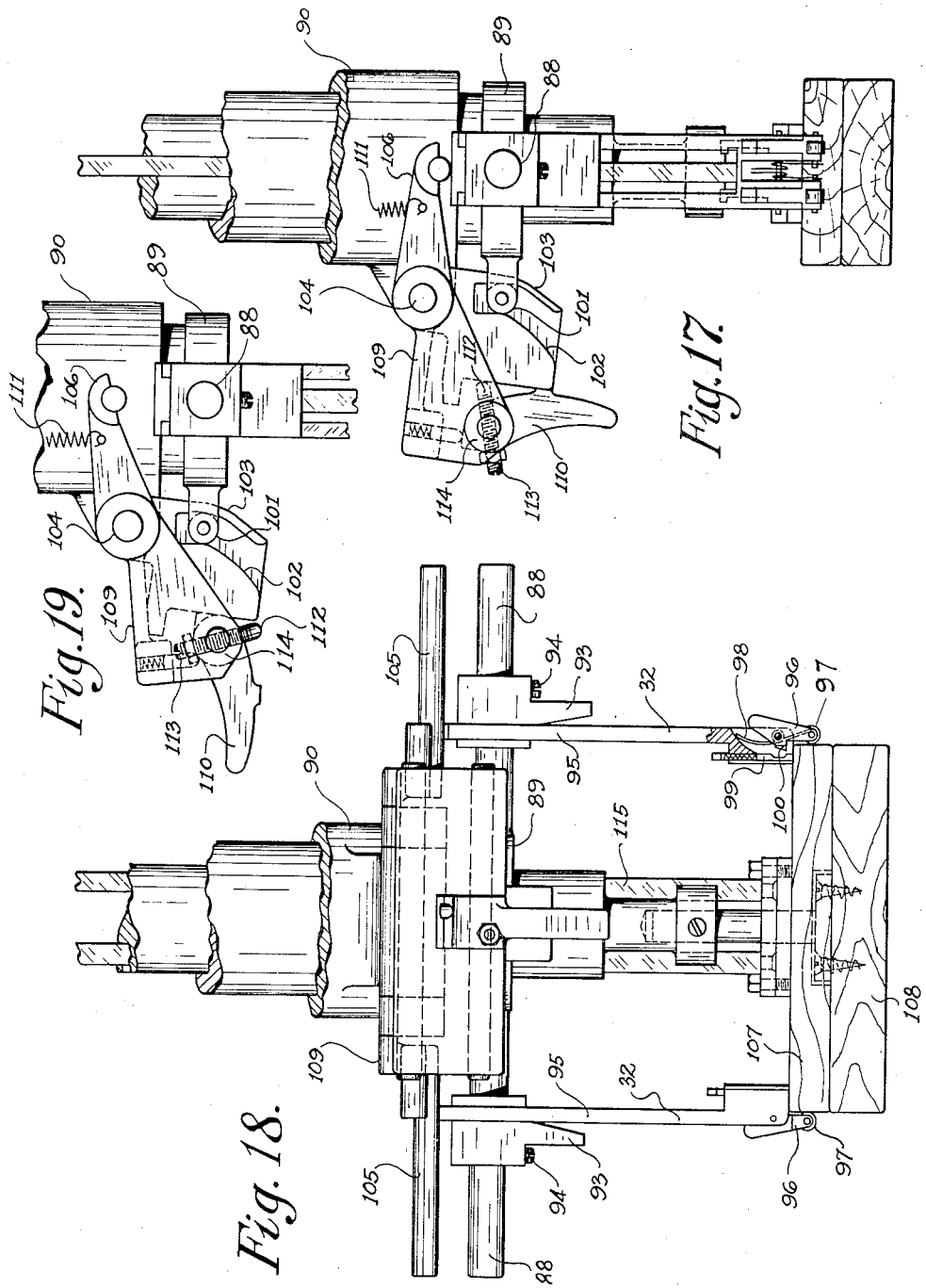

1,916,440

UNITED STATES PATENT OFFICE

ERNEST G. RIDER AND WALTER T. BAILEY, OF PHILADELPHIA, PENNSYLVANIA, ASSIGNORS TO STOKES AND SMITH COMPANY, OF PHILADELPHIA, PENNSYLVANIA, A CORPORATION OF PENNSYLVANIA

METHOD OF AND APPARATUS FOR MAKING BOXES

Application filed October 22, 1930. Serial No. 490,400.

Our invention relates to the art of forming boxes, cartons, containers, or equivalent, hereinafter generically termed "boxes" either by applying wrappers, sheets, labels or equivalent, all hereinafter generically termed "wrappers", and particularly tabbed wrappers; or by applying tabbing or reinforcing material without wrappers to blanks of box material, and particularly to groups of separate, individual box components, sections, or elements of box material.

In accordance with our invention stayed boxes, box blanks, or box components, particularly with adhesively attached sheet-material projecting therefrom, are transported by movable structure through which suction is exerted, for example, to the form block structure or equivalent of a box machine.

In accordance with one aspect of our invention, a box blank, or box component with adhesively attached sheet-material projecting therefrom, and particularly with at least one wall substantially at right angles to the bottom panel, is transferred to the form block structure, and specifically, the upright wall is brought into engagement with a corresponding face of the form block.

More particularly, a box component adapted to form the bottom and sides of a box is pushed by the suction device engaging a substantially upright side panel of the blank toward the form-block; the bottom and unbent side passing beneath the form block, and the upright wall or panel engaging face to face one side of the form block, to the ends of which are held end wall components united to the main component by subsequent operation of the box machine.

Further in accordance with our invention, the suction device controls the operation of the box machine so that in the absence of a box, box blank or box component in engagement with the device at the beginning of the operating cycle, the machine is stopped and preferably resumes operation when a box, or blank is placed in engagement with the device; specifically, the pressure or suction exerted upon a movable member controlling connection of the machine to a source of power is dependent upon the presence of a box blank or equivalent in engagement with the suction device for feeding to the form block.

Also in accordance with our invention, a disengageable connection is provided in mechanism for actuating grippers holding the end wall components against the form block, to permit separation of sections of the form block for removal of box or wrapper material caught there-between.

Our invention also resides in the features of construction, combination, and arrangement hereinafter described and claimed.

For an understanding of our invention and for illustration of a preferred form of our apparatus, reference is to be had to the accompanying drawings in which:

Fig. 1 is an elevational view of one end of a box forming machine.

Fig. 2 is an elevational view of the other end of the same machine.

Fig. 3 is a plan view of the machine shown in Figs. 1 and 2, with parts omitted, and of the end of a wrapper conveying mechanism.

Fig. 4 is a detail view in elevation taken on line 4—4 of Fig. 3.

Figs. 5, 6 and 7 are plan views of transfer mechanism shown in Fig. 1 with different types of box structures in engagement therewith.

Fig. 6a illustrates a one-piece box blank.

Fig. 8 is a sectional view on enlarged scale and an end elevation of feeding mechanism shown in Figs. 1 to 3.

Fig. 9 is a front elevational view of the feeding mechanism of Fig. 8.

Fig. 10 is an end sectional view of suction device shown in Figs. 8 and 9.

Fig. 11 is a rear view of the end of the suction device of Fig. 10.

Fig. 12 illustrates cooperation between the suction device of Fig. 10, box structure transported thereby and form block structure of the box machine.

Fig. 13 corresponds to Fig. 2 with parts omitted and parts broken away to disclose automatic stop mechanism.

Fig. 14 is a plan view, with parts omitted, and parts in section, of Fig. 13, illustrating further details of construction of the automatic stop mechanism.

Fig. 15 discloses parts shown in Fig. 14, in another operating position.

Fig. 16 is a detail view on enlarged scale and in front elevation of form block structure and associated mechanisms shown in Figs. 1 and 2.

Figs. 17 and 18 are respectively end and rear elevational views of the mechanism shown in Fig. 16.

Fig. 19 is a detail view on enlarged scale of latching mechanism in released position.

Fig. 20 is a detail view in front elevation of box wall supporting structure shown in Fig. 8.

Fig. 21 is a sectional view of the upper ends of the form block operating plungers.

Referring to Figs. 1, 2 and 3, upon the pedestal or base 1 is mounted a hollow column 2, which houses the operating cam 3, having grooves, one of which, groove 4, controls the movement of plungers supporting the form block structure F. The cam which is mounted upon a shaft 6 is driven through worm 7 and gear 8 by any suitable source of power connected by the pulley and clutch mechanism 9. At its upper end the shaft 6 is provided with a bevel gear 10 which meshes with the circumferentially spaced bevel gears 11, each of which is associated with the mechanism of one of the slide units 12, generally similar to those disclosed in Federwitz et al., Patent No. 1,541,036.

End forming rolls associated with one pair of units 12, corner-lap turning fingers 15, 15, and the marginal turn-in fingers 16, 16, are all operated in proper sequence in timed relation to movement of the form block structure 9, through the slide unit mechanisms each including the cams 13 and 17 and a gear train 18 driven from the corresponding gear 11. The construction and operation of the mechanism of the slide units form, per se, no part of the present invention and are more fully described in the aforesaid Federwitz et al. patent.

To the rear slide 12 there is attached as by plates 18a, a bridge 19 having feet 20 adjustably clamped as by the bolts 21 to the table 22, mounted upon the upper end of column 2. Upon the bridge 19 on opposite sides of the form block, are adjustably mounted the strip feeding mechanisms 23, 23', and box end gripping and transporting mechanism 24, 24'. The operating shaft for these mechanisms is journaled substantially at its center in a housing 26 mounted upon the bridge 19. The strips S of cardboard, or other suitable box material, are removed by the feeding units 23, 23', from reels 27, 27' mounted upon brackets 28, 28, bolted or otherwise secured to opposite ends of bridge 19. By mechanism more fully described in Rider co-pending application Serial No. 425,751, filed February 4, 1930, each strip is fed to knife structure 29 which at timed intervals severs the strip. Prior to this cutting, the ends of the strip are held by grippers 30 at the end of a swinging arm 31 of transfer mechanism 24, and after the strip is cut to form a box end wall, the arms 31 swing inwardly to the position shown in Figs. 1 and 2, to bring the end wall components cut from the strips against the ends of the form block structure F.

Before the end wall components are released by the grippers 30, the gripping structure 32, at each end of the form block, register the top edges of the components and clamp them securely against the form block, whereupon the grippers 30 open and the arm 31 swings back to its original position to receive the end of strips S.

Referring particularly to Figs. 8 and 9, the top of the front slide unit 12 is provided with a guide plate 33 for a slide 34 having a suction head 35 mounted thereon and reciprocable in a slot 36 of a table 37, mounted upon the slide unit and preferably terminating closely adjacent the path of movement of the form block F. To shaft 38 of the cam 13 of the slide unit is adjustably held a cam 39 whose cam groove 40 cooperates with a roller 41 supported by a slide 42 guided by the rods 43 and carrying a rack 44 meshing with a gear or gear segment 45 which also is in mesh with a gear or gear segment 46, secured to a shaft 47. To the opposite ends of shaft 47 are attached the oscillatory arms 48, to the upper end of each of which is pivotally mounted an arm 48' having a slot 49 for receiving a block 50 upon a shaft 51 extending from an arm 52 of slide 34. A spring 53 forces the block 50 against an adjustable stop 54 at the end of arm 48', the spring serving as a resilient lever arm of adjustable length.

Upon engagement between the side wall s of box structure B, pushed by the suction head 35 along table 37, and a corresponding face of the form block F, the suction head 35 is stopped from further movement by the form block and any additional movement of the arms 48 serves to increase the tension of spring 53 to hold the side wall s of the box structure against the form block.

For suitably timing the operation of the suction head 35, the cam 40 which is rotatable with respect to shaft 38, is secured to a plate 55 permanently attached to shaft 38, as by pin 56, by the bolts 57 or equivalent, which pass through the elongated slots 58 in cam 39. Upon loosening of these bolts, the cam 39 may be rotated with respect to shaft 38, as by inserting a screw driver or other tool, through the openings 59 in the casing 60, for engagement with the slotted head 61 of a shaft carrying a pinion 62 which engages a gear 63 integral with or secured to the plate 55. When the desired adjustment is obtained, the bolts 57 are tightened.

The chamber of the suction head 35 is in communication with a pump 64 through a conduit 65 including a section 65' carried by one of the arms 48, with flexible sections or hose 66 connecting the relatively movable sections of the conduit.

As shown in Fig. 11, the open end of the suction head 35 is preferably covered with a screen 67, or equivalent, of suitably fine mesh, to prevent the suction from forming a blister on the side of the box, when, in accordance with one method, the side of the box engaged by the suction head, is covered by a wrapper panel during transport to the form block.

In lieu of the lever system for effecting reciprocation of the suction head 35, there may be utilized the sliding chain arrangement of co-pending Rider application Serial No. 460,859, filed June 13, 1930.

In the operation of the machine, an operator removes a freshly coated wrapper W, preferably provided with tabs $t$, from the delivery end of a conveyor C, such as, for example, the suction conveyor described in Stokes Patent No. 1,701,317, which receives wrappers from the gluing machine. The box component B, which may, as shown, be adapted to form the bottom $b$ and sides $s$ of a box, is registered with the wrapper W on the table 37 which is preferably provided with transparent or translucent panels 68, beneath which are disposed sources of light, as the electric bulbs 69. The registering is effected by aligning the scoring $d$ of the blank with the corner notches $n$ of the wrapper. The rear panel $s$ of the blank is then folded or bent substantially at right angles with the bottom panel $b$ which remains in engagement with the table 37, and the bent wall brought into engagement with the open end of the suction device 35, with an edge of the upright panel in engagement with the adjustable stop 70, for aligning this edge of the blank or component B with the end of the form block structure F.

Preferably, as shown in Fig. 8, the wrapper side panel is in engagement at this time with the upright side panel $s$ of the box component, although as indicated in Fig. 12 the wrapper panel $s$ need not be applied. The suction head 35 moves from the position generally indicated by the dotted outline in Fig. 8 to the full line position, pushing in advance of it the box structure B, the leading panel $s$ and the bottom panel passing beneath the form block structure F, until the upright panel $s$ engages the corresponding face or side of the form block, to which have been transferred the end wall components E, preferably by the mechanism previously described.

Upon downward movement of the form block from this position, the trailing side panel $s$ is carried downwardly and out of engagement with the suction device 35, both side panels of the blank are subsequently engaged by the rolls 14 which wipe the wrapper side panels firmly into engagement therewith. Subsequently and in the usual manner, the corner laps of the wrapper are turned in by the folding tools 15, the plates 71 pressed by springs 72 against the side walls, hold them in engagement with the form block during the turn-in operation. As indicated in Figs. 8 and 20, the cross bar 73, for supporting the turn-in tools, carries a pair of these plates 71, one adjacent each end of the form block. During this turn-in operation the end wall components E are attached to the main component B by the wrapper and this union is made more complete by the subsequent operations in which the end panels of the wrapper are also folded into engagement with the box. This method of forming three-piece boxes is broadly claimed in co-pending Stokes application, Serial No. 88,231, filed February 15, 1926 and more specifically in co-pending Stokes applications Serial Nos. 147,405, and 363,826 filed November 10, 1926 and May 17, 1929 respectively.

The same machine may be used for forming unwrapped composite boxes. For example, to the box structure B, Fig. 5, there may be adhesively applied the strips $t$ to project beyond the edges of the component B which are in alignment with the ends of the form block F. During the operation of the machine which is as previously described, the tabs $t$ join the end components E to the main component B to form a box.

The same mechanism may be utilized to form boxes from one-piece blanks, such as for example, of the shape or form shown in Fig. 6a. Under these circumstances, the feeding and cutting mechanisms 23 and 24 for forming end wall components from continuous strips S are not used. Preferably and as indicated in Figs. 6 and 16, the end walls E' are held in upright position by the adjustable holders 70a, secured to a rod 74 movable with the suction head 35, and the rear panel of the wrapper W is preferably not applied to the upright side wall $s$ of the blank. The suction head 35 pushes the assembly consisting of the box structure and wrapper to the form block, the leading side panel $s$ and bottom of the box passing beneath the form block substantially flat. As the form-block moves downward, the grippers 32 hold the end walls against the form-block ends and upon continued movement of the form block, the end panels E are withdrawn from the holders 70a and the trailing side panel from the suction head. The remainder of the box forming and wrapping operation is similar to that above described and need not be repeated.

The same transfer or feeding mechanism may be utilized, as indicated in Fig. 7, for feeding previously formed or stayed boxes in engagement with wrappers to the form block structure. As shown, engagement is preferably effected only between the bottom panels of the box and wrapper, the open end of the suction head directly engaging the rear side of the box B2. Alignment of the assembly is readily effected by the adjustable stop 70. It is necessary to change the timing in order that the form block will not be struck by the leading upright side of the box.

Ordinarily, the box machine described runs continuously and when composite boxes are being made as above described, if a main component assembly is not fed to the form block, the end wall components which have been transferred thereto are wasted and upon release by the grippers 32 they may cause jamming of the machine, or otherwise interfere with its subsequent operation. Therefore there is preferably provided mechanism for stopping the machine, if a main component is not in engagement with the suction head 35 at the beginning of the cycle of operation.

Referring to Figs. 13, 14 and 15, a piston 75, or equivalent pressure responsive device, forms the movable wall of a chamber 76 in communication with the suction conduit 65. When the difference in pressure between the conduit and the atmosphere is high, due to engagement between the box structure and the apertured face of the suction head 35, the piston 75 is pushed inwardly, as indicated in Fig. 15, maintaining the latch 77 in retracted position permitting the spring 78 to hold the clutch member 79 in engagement with the corresponding clutch face 80 of the driving pulley 9. So long as a box structure B is against the suction head at the beginning of each cycle for feeding to the form block, the operation of the box machine continues without interruption. If, on the contrary, a box, box blank, or box component is not in engagement with the suction head before the beginning of the feeding stroke, there is little or no difference in pressure between the atmosphere and cylinder 76, and the member 77 is moved to the left to the position shown in Fig. 14 by spring 120a with its end 81 engaging or in the path of movement of a shoulder 82 of the reciprocable member 83 which is moved upwardly as viewed in Fig. 14 at the end of each feeding movement by a cam 84 rotatable with the drum cam 3. This movement of member 77, which is reciprocable transversely of the rod 85, effects withdrawal of the clutch member 79 from the pulley, through the fork member 86, whereupon the box machine stops. Specifically, cam 84 lifts member 83, as viewed in Fig. 14, thereby lifting rod 85 which carries the fork member 86 since member 77 operatively connect the rod 85 to the reciprocable member 83. When a box blank is brought against the suction device, the suction moves the piston 75 inwardly, withdrawing the latch member 77 from engagement with the member 83, and so permitting the spring 78 to again effect driving relation between the cooperating clutch member 79 and 80.

The valve 87 may be provided in the suction head to permit operation of the machine although no box structure is engaged by the suction head. This is of advantage when the box machine is utilized for forming composite boxes as in starting at the beginning of a run, there are no end wall components E against the form block.

Starting and stopping of the box machine may be manually controlled by the pedal 116 at one end of a bell crank lever 117, whose other end is pivoted to an arm 118 having a lost motion connection through the link 119 to the latching member 77, a spring 120 returning the treadle to normal position after it has been depressed to start the machine. Unless the treadle is continuously held down, or latched in down position, the machine will complete one wrapping cycle and then stop. In the construction described, this manual control may be utilized when the automatic suction control is disabled or disconnected for example by a valve connected between cylinder 76 and conduit 65.

Referring to Figs. 16 to 19, the gripper mechanisms 32 for holding the end wall components against the end of the form block are generally similar to those described and claimed in co-pending Rider application 425,751, aforesaid. The bars 88 are mounted upon and secured to the lower end of a plunger 89 which is guided by the cylinder 90 mounted upon the gooseneck standard 91 and operated by the lever 92 which is operated in the usual manner from the main operating cam 3. The guide blocks 93 adjustably clamped to the rods 88 on opposite sides of plunger 89 by screws 94 or equivalent, are each recessed or grooved to receive a reciprocable slide 95 whose lower end carries the pivoted holding fingers 96, preferably having rollers 97 at their lower ends, and biased for rotation by springs 98. Each locking pin 99 is adapted to engage a projection 100 of the corresponding holding finger 96.

As the plunger 89 approaches the top of its stroke, the roller 101 engages the cam face 102 with the member 103 pivoted at 104 to the stationary guiding cylinder 90, effecting downward movement of the bars 105 extending from the ends of the forked arm 106 pivoted at 104. The bars 105 each engage the top of a slide 95 and force it downwardly into engagement with the top of the upper form block section 107.

To permit separation of the upper form block section 107 from the lower form block section 108, there is included a disengageable connection between the operating roller 101 connected to plunger 89, and the arm 106.

Preferably, and as indicated, at the outer end of an arm 109 integral with or connected to the arm 106, is pivoted a locking member 110 which normally connects the pivoted cam member 102 to the arm 106 so that they move as a unit. Upon movement of the member 110 to the position shown in Fig. 19, the springs 111 move the arm 106 upwardly and independently of the cam member 102. The extent of this movement, as is clear from comparison of Figs. 17 and 19 is related to the difference between the extent to which the end 112 of the adjustable screw 113 projects beyond the axis of rotation of the member 110, and the radius of the hub section 114 of the locking member 110.

Upon release of the latch 110, the bars 105 move upwardly to substantial extent, and by inserting a screw driver or other suitable tool between the form block sections, the section 107 may be moved upwardly without opposition from the mechanism otherwise linking the upper form block to the plunger 89 when the plunger 115 carrying the upper form block and the plunger 89 are in their upper position at the beginning of the cycle of operation of the box machine.

After removal of any box material which may have been caught between the form block sections, a spring 130, (Fig. 21), and ordinarily used for interconnecting the form blocks as shown more fully in Federwitz et al. Patent No. 1,541,255, restores engagement between the form blocks. The normal operating connections are restored by moving the locking member 110 downwardly to the position shown in Fig. 17.

What we claim is:

1. In the operation of a box machine having form-block structure, the method of feeding a blank adapted to form at least the bottom and a pair of opposite walls of a box, which comprises bending one of said walls, and moving the blank substantially at right-angles to the form block structure until the bent wall engages the corresponding face of the form block structure.

2. In the operation of a box machine having form-block structure, the method of feeding a blank adapted to form at least the bottom and a pair of opposite walls of a box, which comprises, bending one of said walls, and moving the blank substantially at right-angles to the form block structure until the bottom panel thereof registers with the bottom of the form-block structure and the bent wall engages the corresponding face of the form block structure.

3. In the operation of a box machine having form-block structure, the method of feeding a blank adapted to form at least the bottom and a pair of opposite box walls which comprises, adhesively securing sheet material to the blank to project therefrom, bending one of said walls, and moving the blank and projecting sheet material substantially at right-angles to the form block structure to bring the bent wall into engagement with the corresponding face of the form block structure.

4. In the operation of a box machine having form-block structure, the method of feeding a blank adapted to form at least the bottom and a pair of opposite box walls which comprises, adhesively securing sheet material to the blank to project therefrom, bending one of said walls and sheet material applied thereto, and thereafter moving the blank while bent substantially at right angles to the form block structure to bring said wall into engagement with the corresponding face of the form block structure.

5. The method of making boxes which comprises feeding box end wall components into engagement with opposite ends of form block structure, bending a side panel of a component adapted to form the box bottom and sides, feeding said component while bent to bring said side panel thereof into engagement with the corresponding face of the form block structure and the opposite edges thereof into abutting relation with corresponding edges of said end wall components, thereafter bending the other side panel into engagement with the opposite face of said form block structure and the opposite edges thereof into abutting relation with the corresponding edges of said end wall components, and attaching said components to form a box.

6. The method of making boxes which comprises feeding box end wall components into engagement with opposite ends of form block structure, adhesively applying sheet material to a component adapted to form the box bottom and sides to project therefrom, bending a side panel of said component, feeding said component while bent and with the applied sheet material projecting therefrom to bring said side panel thereof into engagement with the corresponding face of the form-block structure, and edges thereof into abutting relation with corresponding edges of the end wall components, thereafter bending the other side panel of said component to bring edges thereof into abutting relation with corresponding edges of the end wall components completing the box-forming relation, and folding the projecting sheet material into adhesive engagement with the end wall components.

7. Transfer mechanism for box structures comprising a member through which suction is exerted upon an upright side wall of a box structure, a surface for supporting said structure, and means effecting movement of member to push the box structure held thereagainst by suction along said surface.

8. In a box machine having a form block, means for transferring a box structure and projecting adhesive-coated sheet material applied thereto comprising a member through which suction is exerted upon said box structure, and mechanism for reciprocating said member toward and away from said form block.

9. In a box machine having a form block, means for transferring a box structure comprising a reciprocating member having a face substantially and continuously parallel to a side of said form block through which suction is exerted upon a side panel of said box structure, stop structure cooperating with said member for aligning said box structure with respect to said form block, and mechanism for effecting movement of said member to deliver said box structure to said form block.

10. In a box machine having a form block, means for transferring unstayed box structure comprising a member through which suction is exerted upon a side panel of said box structure, and driving mechanism for said member including means tensioned upon engagement between said panel and the corresponding face of said form block.

11. In a box machine having a form block, means for transferring unstayed box structure comprising a member for holding a side panel thereof at an angle to the bottom panel, and operating mechanism for said member including means tensioned upon engagement between said side panel and the corresponding face of said form block.

12. Transfer mechanism for box structures comprising a member through which suction is exerted upon a box structure, and means for controlling the operation of said mechanism comprising means responsive to the suction exerted through said member.

13. Transfer mechanism for box structures comprising a member through which suction is exerted upon a box structure, driving means for said transfer mechanism, means for disengageably connecting said driving means to said transfer mechanism, and means for controlling said connecting means comprising structure movable in response to the suction exerted through said member.

14. Transfer mechanism for box structures comprising a suction conduit, a member having apertures in communication with said conduit in a face engaged by box structure, and means for controlling the operation of said mechanism comprising a structure movable in response to the pressure in said conduit.

15. A box machine having movable box-forming mechanism, means for delivering box structures to said mechanism comprising a movable member through which suction is exerted upon box structure, and means for controlling the operation of said machine comprising structure movable in response to the suction exerted through said member.

16. A box machine comprising a form-block, means for feeding separate box components of a composite box to said form block, and mechanism for controlling the operation of said machine comprising means responsive to the absence of a box component for feeding.

17. A box machine comprising a form block, means for feeding separate box components of a composite box to said form-block including a member through which suction is exerted, and means responsive to said suction for controlling the operation of said machine.

18. A box machine comprising box forming mechanisms, means for delivering box structures thereto including a suction member, driving means for said box machine, means for disconnecting said driving means from said box machine at the end of a cycle of operation, and means for disabling said disconnecting means to permit continuous operation of said machine comprising structure responsive to the suction exerted by said member.

19. A box machine for making composite boxes from separate box components comprising form block structure, mechanism for cutting one or more of said box components from continuous strips of box material, mechanism for feeding box components to said form block structure, including a suction member, driving means for said box machine, means for disconnecting said driving means from said box machine at the end of a cycle of operation, and means for normally disabling said disconnecting means comprising structure responsive to the suction exerted by said member.

20. A box machine comprising a form block, a movable plunger for supporting said form block, a second plunger, a member movably supported by said second plunger, and means actuable by said second plunger for effecting movement of said member into engagement with said form-block including latching structure releasable to permit movement of said form block unopposed by said member.

21. A box machine comprising a form block, a movable plunger for supporting said form block, a second plunger, gripper mechanism for holding box structure against said form block, a member movably supported by said second plunger carrying said gripper mechanism, and means actuable by said second plunger for effecting movement of said member into engagement with said form block including latching structure releasable to permit movement of said form block unopposed by said member.

22. A box machine comprising a form block, a movable plunger for supporting said form block, a second plunger, a member movably supported by said second plunger, and means actuable by said second plunger for effecting movement of said member into engagement with said form block, comprising structure moved by said second plunger, structure adapted to move in the path of said member, and means for detachably connecting said structures.

23. A box machine, comprising a form block, a movable plunger for supporting said form block, a second plunger, gripper mechanism for holding box structure against said form block, a member movably supported by said second plunger carrying said gripper mechanism, and means actuable by said second plunger for effecting movement of said member into engagement with said form block, comprising structure moved by said second plunger, structure adapted to move in the path of said member, and means for detachably connecting said structures.

24. A box machine comprising a form block, a movable plunger for supporting said form block, a second plunger, gripper mechanism for holding box structure against said form block, a member slidably supported by said second plunger and carrying said gripper mechanism and means for effecting movement of said member into engagement with said form block comprising a pivoted cam actuated by said second plunger, a pivoted arm adapted to engage said member, and latching structure for releasably coupling said cam and arm.

25. A box machine having superimposed form blocks, a plunger for supporting said form blocks, a spring connecting said form blocks, a second plunger, a member movably supported by said plunger, and means for effecting engagement between said member and one of said form blocks including latch structure releasable to permit separation of said form blocks opposed solely by said spring.

26. In a box machine having a form block, means for transferring an unstayed box comprising a member through which suction is exerted upon an upright side panel of said box, means for moving said member toward said form block, and structure for holding the end panels of said box in substantially upright position during movement by said member.

27. In a box machine having a form block, means for transferring an unstayed box comprising structure holding the end panels and one side panel of said box bent to upright position, and means for moving said structure toward said form block, the other side panel passing below and substantially parallel with the bottom of said form block.

28. In a box machine having a form block, means for transferring an unstayed box comprising a member through which suction is exerted upon an upright wall of said box, structure carried by said member for holding the opposite walls of a box in upright position against said first wall, and means for moving said member and said structure carried thereby toward said form block.

29. In the art of making wrapped boxes, the method which comprises effecting adhesive engagement between the bottom panels of a wrapper and an unstayed box, bending the end panels and side panel of the box only into substantially upright position, transporting the box with the bent panels temporarily held in position and with the wrapper adhering as aforesaid to a wrapping station, and at said station bending the other side panel of the box and completing application of the wrapper permanently to hold said panels in box-forming position.

30. A box wrapping machine comprising structure upon which wrappers and box elements are assembled, wrapper-applying mechanism adjacent said structure and including a vertically reciprocating form block, and means for transferring box and wrapper assemblies from said structure to said wrapper-applying mechanism comprising a reciprocating member movable transversely of said structure and having suction means operative to hold a box and wrapper assembly during its transfer by said member.

ERNEST G. RIDER.
WALTER T. BAILEY.